US012682862B2

(12) United States Patent    (10) Patent No.:   US 12,682,862 B2

Kaufman-Fridman et al.    (45) Date of Patent:     Jul. 14, 2026

(54) FIELD REPAIR RECALIBRATION

(71) Applicant: Microsoft Technology Licensing, LLC, Redmond, WA (US)

(72) Inventors: Shmuel Kaufman-Fridman, Tel-Aviv (IL); Eran Arbel, Raanana (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 171 days.

(21) Appl. No.: 18/788,656

(22) Filed: Jul. 30, 2024

(65) Prior Publication Data

US 2024/0386860 A1    Nov. 21, 2024

Related U.S. Application Data

(63) Continuation of application No. 18/051,415, filed on Oct. 31, 2022, now Pat. No. 12,080,253.

(51) Int. Cl.
| | |
|---|---|
| *G09G 3/36* | (2006.01) |
| *G01J 1/42* | (2006.01) |
| *G01J 1/44* | (2006.01) |
| *G02F 1/13* | (2006.01) |

(52) U.S. Cl.
CPC .......... *G09G 3/3607* (2013.01); *G01J 1/4204* (2013.01); *G01J 1/44* (2013.01); *G02F 1/1309* (2013.01); *G09G 2320/0242* (2013.01); *G09G 2320/0666* (2013.01); *G09G 2320/0693* (2013.01); *G09G 2330/12* (2013.01); *G09G 2354/00* (2013.01); *G09G 2360/144* (2013.01)

(58) Field of Classification Search
CPC ......... G09G 3/3607; G09G 2320/0242; G09G 2320/0666; G09G 2320/0693; G09G 2330/12; G09G 2354/00; G09G 2360/144; G09G 5/02; G09G 3/2003; G09G 2340/06; G01J 1/4204; G01J 1/44; G02F 1/1309
See application file for complete search history.

(56) References Cited

U.S. PATENT DOCUMENTS

2016/0070414 A1*   3/2016   Shukla .................. G06F 3/0412
345/178

* cited by examiner

*Primary Examiner* — Georgia Y Epps
*Assistant Examiner* — Monica T Taba
(74) *Attorney, Agent, or Firm* — Weaver IP L.L.C.

(57)       ABSTRACT

Methods, systems, and computer program products are provided for field repair recalibration. A field repairable device with a field repairable component (e.g., field replaceable unit (FRU)) is recalibrated in the field. A light sensor dependent on one or more optical layers in a display module is recalibrated in the field based at least in part on the properties of a post-repair FRU that replaced a damaged/ inoperable pre-repair FRU. A field recalibrator (e.g., in a field repairable device and/or in a field repair device) may be configured to generate an in-field recalibration of a sensor based at least in part on a pre-repair sample generated by the sensor before repair of a field repairable component and a post-repair sample generated by the sensor after repair of the field repairable component.

20 Claims, 9 Drawing Sheets

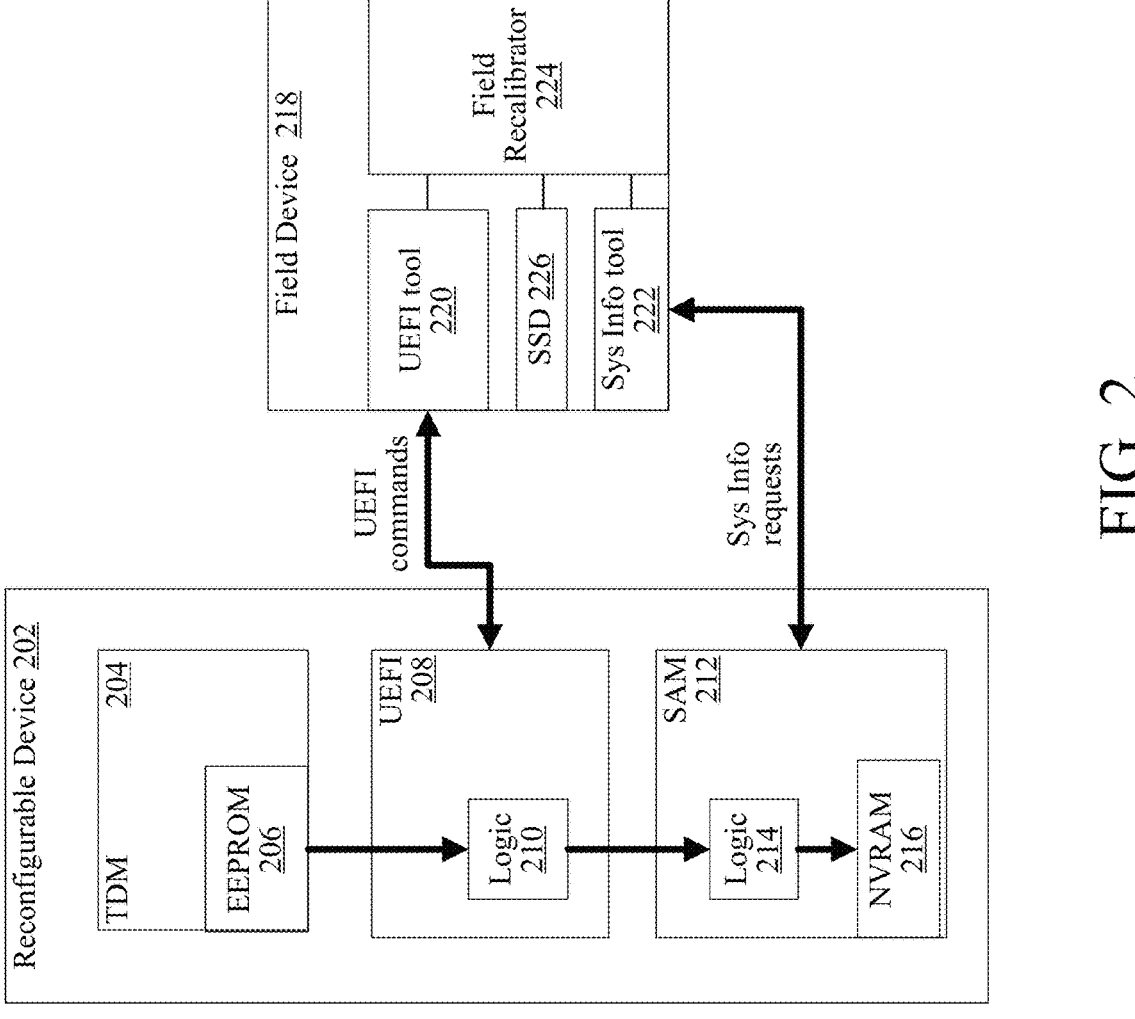
FIG. 2

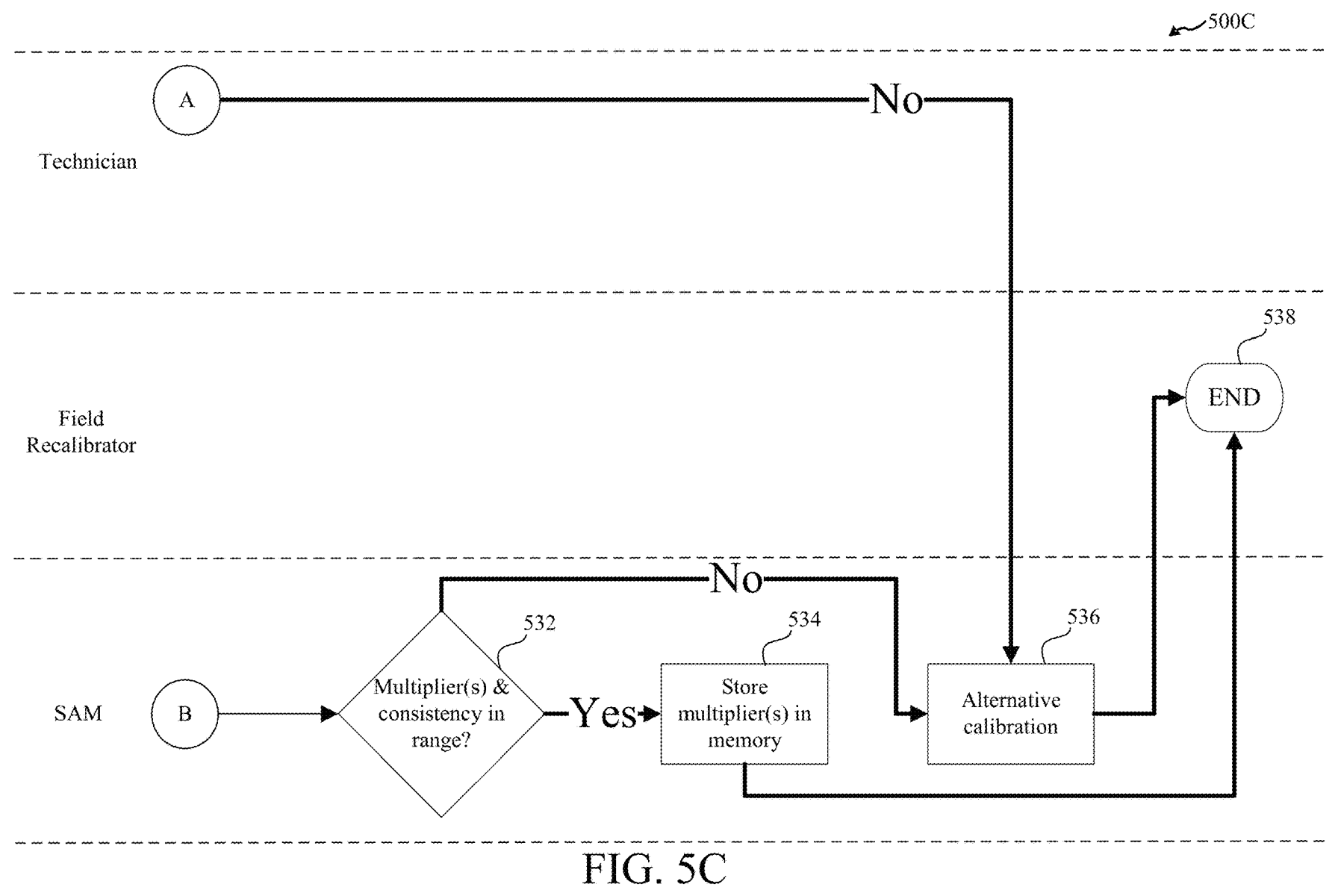

Technician

Field
Recalibrator

SAM

A

No

B

532
Multiplier(s) &
consistency in
range?

No

Yes

534
Store
multiplier(s) in
memory

536
Alternative
calibration

538
END

FIG. 5C

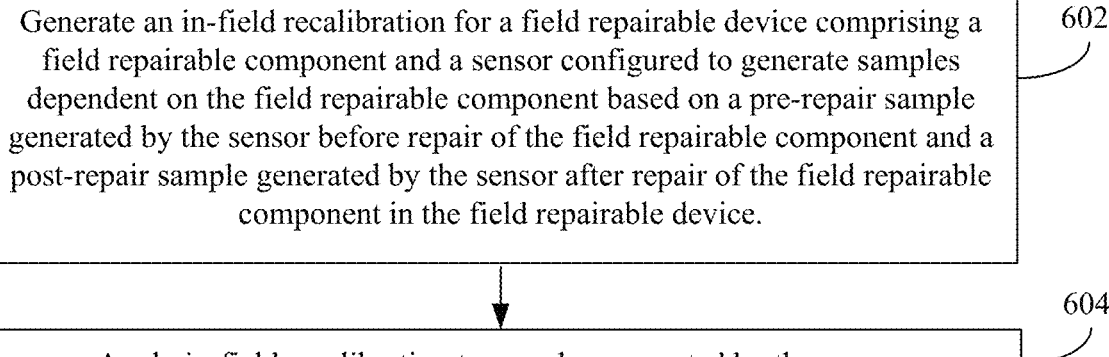

600

Generate an in-field recalibration for a field repairable device comprising a field repairable component and a sensor configured to generate samples dependent on the field repairable component based on a pre-repair sample generated by the sensor before repair of the field repairable component and a post-repair sample generated by the sensor after repair of the field repairable component in the field repairable device.

602

Apply in-field recalibration to samples generated by the sensor

FIELD REPAIR RECALIBRATION

CROSS-REFERENCE TO RELATED APPLICATIONS

This application is a continuation of, and claims priority to, allowed U.S. patent application Ser. No. 18/051,415, filed on Oct. 31, 2022, entitled "FIELD REPAIR RECALIBRATION," the entirety of which is incorporated by reference herein.

BACKGROUND

Field repair of device components is frequently performed without complex factory equipment (e.g., jigs, special lab equipment) and without a tightly controlled environment. Such repair, including replacement of a component, may affect operation of another component and/or combined operation, resulting in degraded performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for field repair recalibration. A field repairable device with a field repairable component (e.g., field replaceable unit (FRU)) is recalibrated in the field. A light sensor dependent on one or more optical layers in a display module is recalibrated in the field based at least in part on the properties of a post-repair FRU that replaced a damaged/inoperable pre-repair FRU. A field recalibrator (e.g., in a field repairable device and/or in a field repair device) may be configured to generate an in-field recalibration of a sensor based at least in part on a pre-repair sample generated by the sensor before repair of a field repairable component and a post-repair sample generated by the sensor after repair of the field repairable component.

Further features and advantages of the subject matter (e.g., examples) disclosed herein, as well as the structure and operation of various embodiments, are described in detail below with reference to the accompanying drawings. It is noted that the present subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a computing environment for field recalibration, according to an example embodiment.

FIGS. 5A-5C show interaction diagrams for field recalibration based on pre-repair and post-repair sensor measurements, according to example embodiments.

FIG. 6 shows operation of field repair recalibration, according to an example embodiment.

Figure 1:
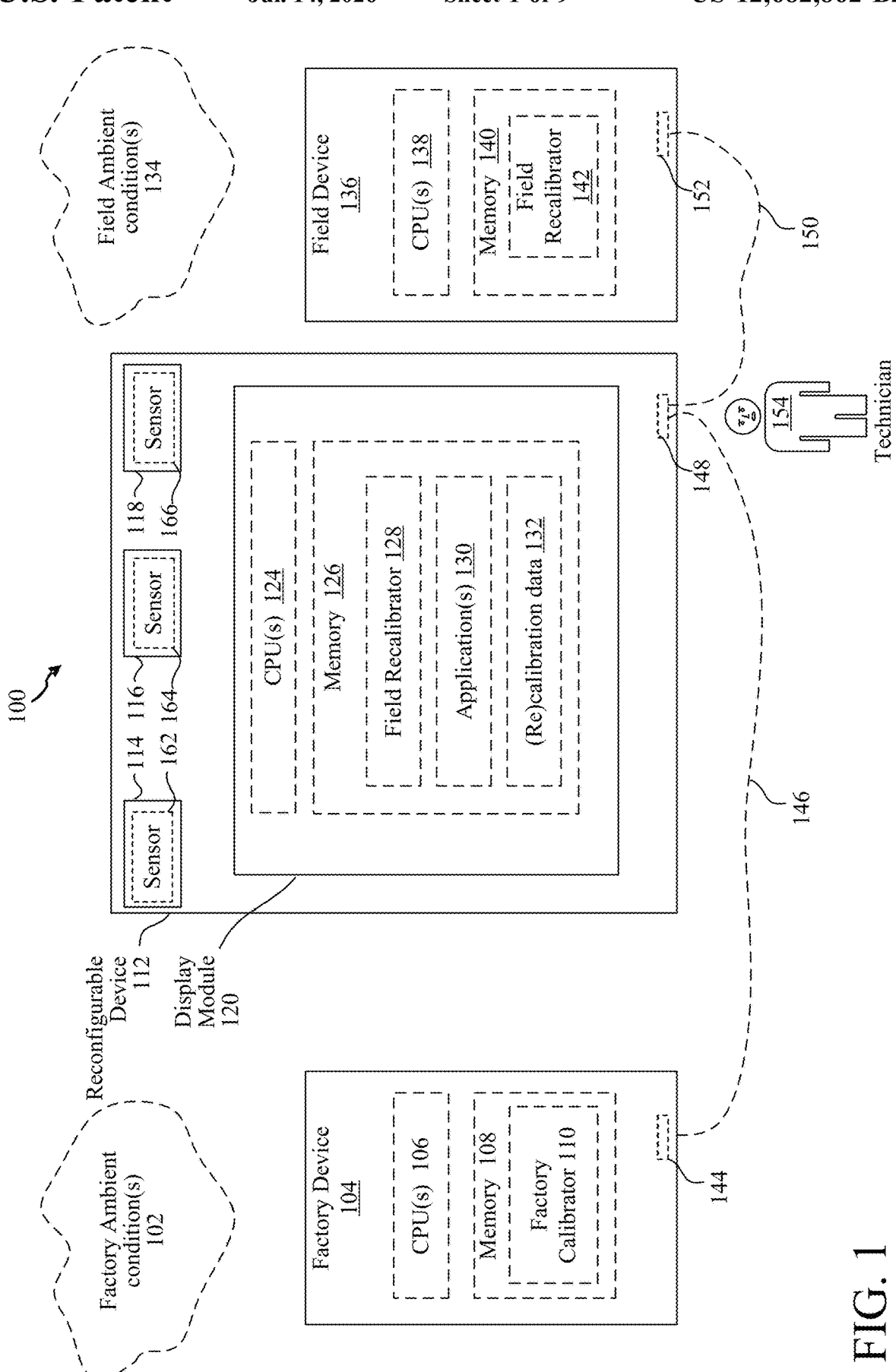
FIG. 1 shows computing environments for factory calibration (including first time calibration and subsequent recalibration) and field recalibration of a device, according to an example embodiment.

The features and advantages of the examples disclosed will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Field repair of device components is frequently performed without complex factory equipment (e.g., jigs, special lab equipment) and without a tightly controlled environment. Such repair, including replacement of a component, may affect operation of another component and/or combined operation, resulting in degraded performance. A lack of calibration and/or generic recalibration for repaired devices often degrades performance and reduces user satisfaction.

Furthermore, a device (e.g., a tablet, cellular phone) with a display module (e.g., a touch display module (TDM)) may utilize one or more sensors. For example, a light and color sensor may be used to dynamically change the display backlight and color scheme according to the ambient light condition outside a device to deliver the most accurate colors and pleasant lighting intensity to a user. A light sensor may be placed within the display assembly, such as on a bezel or beneath a display module (e.g., a liquid crystal display (LCD)).

Still further, a display (e.g., a TDM module) may be replaced in a tablet device, for example, due to breakage or other malfunction. The calibration of the light and color sensor may be affected by a repair or replacement of all or a portion of a display. A coverglass "decoration" (e.g., the sensor's aperture within black print) may have production variations, e.g., in terms of optical performance (e.g., properties/characteristics).

A similarity in performance of the display after repair compared to performance before damage/inoperability (e.g., ability to adapt to an ambient environment before a TDM replacement process is performed) may be determined in a factory production setting using expensive equipment that is not available for field service providers.

Embodiments overcome such limitations. For instance, in embodiments, light and color measurements of a light and color sensor before and after TDM replacement may be used to determine one or more recalibration factors/parameters, which may be calculated to allow the light and color sensor to deliver accurate measurements without a factory process.

As such, methods, systems, and computer program products are provided for field repair recalibration. A field repairable device with a field repairable component (e.g., field replaceable unit (FRU)) may be recalibrated in the field. Field recalibration may be component-specific without sophisticated factory calibration equipment. For example, a light sensor (e.g., brightness and/or color measurements) dependent on one or more optical layers in a display module (e.g., a touch display module) may be recalibrated in the field based on the properties of the post-repair FRU that replaced a damaged/inoperable pre-repair FRU (e.g., TDM or a portion thereof). A sensor may be integrated in or separate from an FRU. A field recalibrator (e.g., in a field repairable device and/or in a field repair device) may be configured to generate an in-field recalibration of a sensor based at least in part on a pre-repair sample generated by the sensor before repair of a field repairable component; and a post-repair sample generated by the sensor after repair of the field repairable component.

For example, an in-field measurement of light and color of the ambient environment (e.g., as recorded by the sensor) before the TDM is replaced may be obtained. An in-field measurement of light and color of the ambient environment (e.g., as recorded by the sensor) after the new TDM is installed may be obtained. Both measurements are made with respect to the ambient environment to provide a common baseline to isolate differences due to TDM replacement.

In particular, a factor may be calculated between the sensor reading with the old TDM installed and the sensor ambient environment reading when the new TDM is installed. The recalibration parameter(s) may be added to the device's non-volatile memory to be applied by the color sensor to ambient environment measurements to improve accuracy without factory measurement equipment. In turn, the display light and color output of the field-repaired TDM may be more accurate. The field recalibration adaptation feature may be enabled or disabled to affect or not affect the output of the display.

An alternative (e.g., default or non-component-customized) recalibration may be generated, stored, applied, for example, if the TDM is damaged/broken in the sensor area. The non-customized recalibration may provide degraded performance relative to the component-customized recalibration.

Such embodiments may be implemented in various configurations and environments, examples of which are shown and discussed relative to FIGS. 1-7. For instance, FIG. 1 shows a factory (re)calibration and field recalibration environment 100, according to an example embodiment. Example environment 100 includes one or more factory ambient conditions 102 and one or more field ambient conditions 134. Environment 100 further includes a factory device 104, a reconfigurable device 112 and a field device 136. As shown in FIG. 1, factory device 104 includes one or more central processing units (CPUs) 106, a memory 108 (which includes a factory calibrator 110), and a device communication interface 144. Device 112 includes first-third components 114, 116, and 118 (which respectively include first-third sensors 162, 164, and 166), a device communication interface 148, and a display module 120, which includes one or more CPUs 124 and a memory 126 that includes a field recalibrator 128, one or more applications 130, and (re)calibration data 132. Field device 136 includes one or more CPUs 138, a memory 140 (that includes a field recalibrator 142), and a field device communication interface 152. Example environment 100 presents one of many possible examples of the calibration/recalibrations of devices and is described in further detail as follows.

Figure 7:
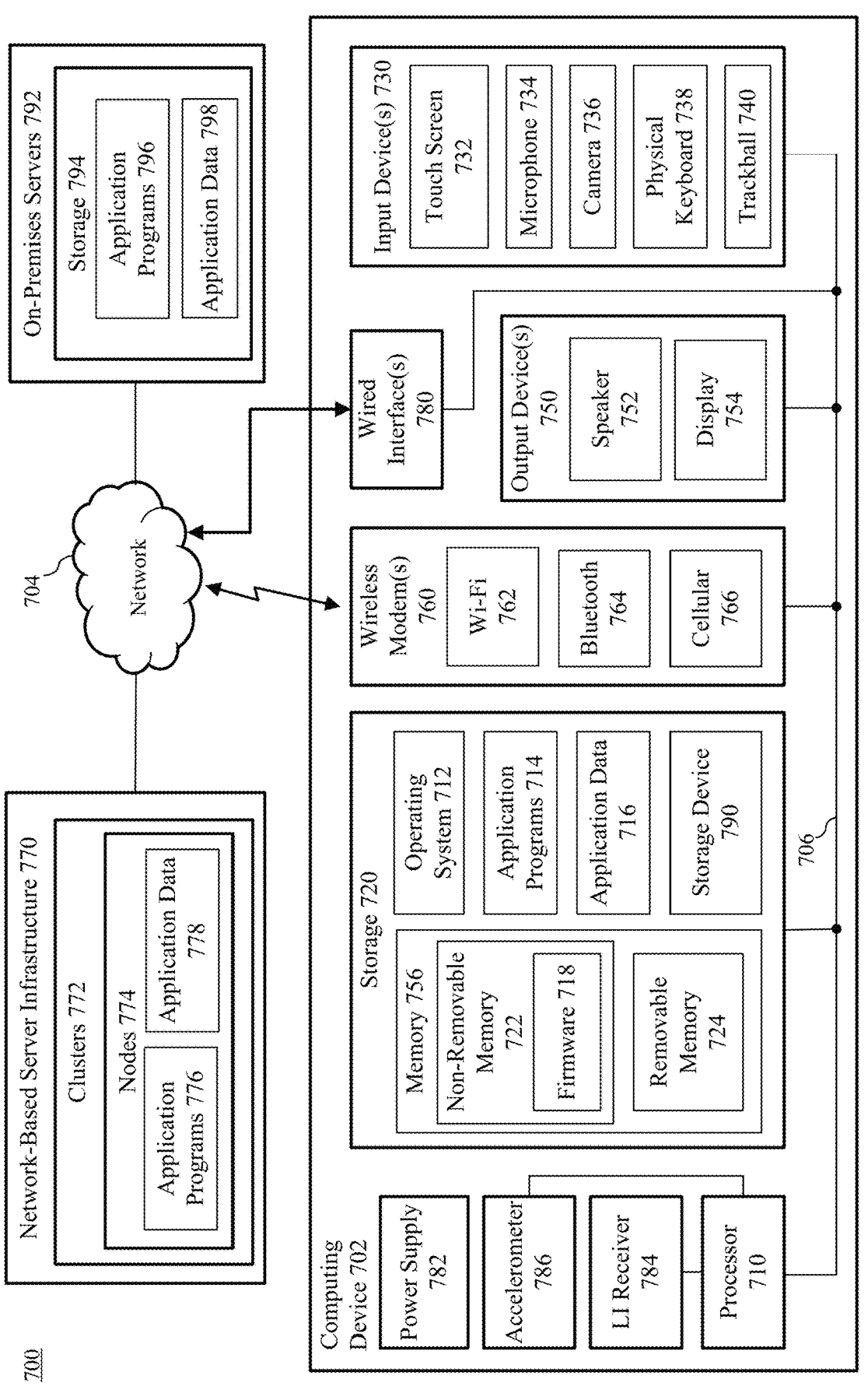
FIG. 7 shows a block diagram of an example computer system in which embodiments may be implemented.

Factory device 104 may be a computing device with CPU(s) 106, memory 108, and/or other computing components, such as components shown by example in FIG. 7. Factory device 104 may store (e.g., in memory 108) and execute (e.g., by CPU(s) 106) factory calibrator 110, for example, among one or more applications, operating systems, virtual machines (VMs), etc., that may be executed, hosted, and/or stored therein or via one or more other computing devices via network(s) (not shown). In various examples, factory device 104 may be any type of stationary or mobile computing device, including a mobile computer or mobile computing device, server, or other type of device mentioned elsewhere herein or otherwise known. A computing environment may be any computing environment (e.g., any combination of hardware, software, and firmware). An example computing device with example features is presented in FIG. 7.

Factory device 104 may be communicatively coupled to device 112. For example, a factory device communication interface 144 may be communicatively coupled to a device communication interface 148 via a wireless and/or a wired communication connection. Factory device 104 may execute one or more processes in one or more computing environments. A process is any type of executable (e.g., binary, program, application) that is being executed by a computing device. A process may include a (re)calibration process (e.g., an instance of factory calibrator 110), which may be used to (re)calibrate one or more components in device 112 in a factory setting with factory ambient condition(s) 102 (e.g., lighting conditions, temperature, and/or the like). For example, factory calibrator 110 may calibrate one or more sensors in device 112 (e.g., if/when device 112 is manufactured) and/or recalibrate one or more sensors in device 112 (e.g., if/when device 112 is repaired). Technician 154 may be a factory technician interacting with a user interface provided by factory calibrator 110.

In an embodiment, field device 136 may be present in environment 100, and in environment 100 is a field repair device used to repair other devices (e.g., performs in-field recalibration through operation of field recalibrator 142) such as reconfigurable device 112, in which case reconfigurable device 112 is considered a field repairable device. In embodiments, field device 136 may be a computing device with CPU(s) 138, memory 140, and/or other computing components, such as components shown by example in FIG. 7. Field device 136 may store (e.g., in memory 140) and execute (e.g., by CPU(s) 138) field recalibrator 142, for example, among one or more applications, operating systems, virtual machines (VMs), etc., that may be executed, hosted, and/or stored therein or via one or more other computing devices via network(s) (not shown). In various examples, field device 136 may be any type of stationary or mobile computing device, including a mobile computer or mobile computing device, server, or other type of device mentioned elsewhere herein or otherwise known.

Field device 136 may be communicatively coupled to device 112. For example, a field device communication interface 152 may be communicatively coupled to a device communication interface 148 via a wireless and/or a wired communication connection. Field device 136 may execute one or more processes in one or more computing environments. A process is any type of executable (e.g., binary, program, application) that is being executed by a computing device. A process may include an in-field recalibration process (e.g., an instance of field recalibrator 142), which may be used to recalibrate one or more components in device 112 in a field setting with field ambient condition(s) 134 (e.g., lighting conditions, temperature, and/or the like). For example, field recalibrator 142 may recalibrate one or more sensors in device 112 if/when device 112 is repaired. Technician 154 may be a factory technician interacting with a user interface provided by factory calibrator 110.

In embodiments, reconfigurable device 112 may be a field repair device and/or a field repairable device. For instance, in environment 100, device 112 may be repaired by field device 136 (operating as a field repair device to perform in-field recalibration). Alternatively, device 112 may be both a field repair device and field repairable device that repairs itself (operating as field repair device to perform in-field recalibration by operation of field recalibrator 132, while also operating as a field repairable device being recalibrated). Device 112 may be a computing device with CPU(s) 124, memory 126, and/or other computing components, such as components shown by example in FIG. 7. Device 112 may store (e.g., in memory 126) and execute (e.g., by CPU(s) 124) field application(s) 130 and (e.g., in some examples) recalibrator 128, for example, among one or more applications, operating systems, virtual machines (VMs), etc., that may be executed, hosted, and/or stored therein or via one or more other computing devices via network(s) (not shown). In various examples, device 112 may be any type of stationary or mobile computing device, including a mobile computer or mobile computing device, server, or other type of device mentioned elsewhere herein or otherwise known.

Device 112 may be, for example, a tablet computing device, a cellular phone, a camera, or any other device that utilizes at least one calibrated component. Device (e.g., tablet) 112 may include, for example, display module 120, which may be a touch display module (TDM). Display module 120 may include an optical stack up, which may include one or more layers, such as a diffuser, lens, cover glass, aperture, decoration, holes, filters (e.g., IR ink), etc. Display module 120 and each of the layers and therein may be a field repairable component that may be repaired (e.g., replaced) in the field when determined to be damaged, defective, or otherwise operating improperly or otherwise designated for repair/replacement. When replaceable as a whole, display module 120 may be considered a field replaceable unit (FRU). One or more layers in the optical stack up may be associated with (e.g., may physically cover) one or more calibrated components, such as first, second, and/or third components 114, 116, 118. In some examples, first, second, and third components 114, 116, 118 may be first, second, and third sensors 162, 164, 166 (e.g., adaptable color sensor (ACS), adaptable light sensor (ALS), color and light sensor, accelerometer sensor, gyroscope sensor). Light sensor, ACS, ALS, color and light sensor, and the like may be used interchangeably herein. The example discussed is a light sensor (e.g., first component 114) calibrated based on an optical stack up in display module 120, although the disclosure is applicable to many other examples of components calibrated based on field repairable components.

Components (e.g., sensors) may be, for example, on-TDM components, non-TDM components, or partial-TDM components. On-TDM components may be part of a TDM, such that they may be replaced during a TDM field replacement. Non-TDM components may not be part of a TDM, such that they may not be replacement in a TDM field replacement. Partial-TDM components may not be part of a TDM, but may be affected themselves or other associated components may be affected by repair/replacement of one or more portions (e.g., layers) of a TDM. For example, an application or algorithm that utilize sensor measurements may be affected by a sensor if measurements made by the sensor are based on (e.g., sensitive to) the properties/characteristics/operation of one or more field repairable portions of a TDM.

Device memory 126 may represent one or more memories associated with (e.g., read and/or written by) one or more components. For example, device memory 126 may represent an EEPROM storing calibration data 132 associated with display module 120, an NVRAM associated with field recalibrator 128, system memory storing application(s) 130, operating system(s) (not shown), etc. Device memory 126 may store, for example, field recalibrator 128, application(s) 130 and calibration data 132. Calibration data 132 may include calibration data generated by factory calibrator 110 and/or field recalibration data generated by field recalibrator 128 and/or field recalibrator 142. One or more applications 130 may use calibration data 130, for example, to perform calculations, comparisons, make determinations, etc. In some examples, calibration data may be determined/generated and stored by factory calibrator 110 to adjust light sensor measurement values (e.g., light and/or color property values) based on the optical properties of one or more (e.g., all) layers in display module 120, which may vary among display modules.

Device 112 may execute one or more processes in one or more computing environments. A process is any type of executable (e.g., binary, program, application) that is being executed by a computing device. A process may include one or more instances of applications 130 and/or field recalibrator 128. One or more applications 130 may utilize calibration data 132. For example, an application may apply calibration data to light sensor measurement data generated by first component (e.g., light sensor) 114. A process executed by device 112 may include a firmware interface to access and/or modify firmware (e.g., calibration data 132). For example, a firmware interface may include or comprise a unified extensible firmware interface (UEFI), which allows operating system access to firmware. Field recalibrator 128/142 may be configured to read and write calibration data 132 via UEFI logic instructions. Field recalibrator 128/142 may be configured to access other device information (e.g., adaptive color sensor (ACS) sample data), for example, via An in-field repair/replacement of one or more components in device 112 may be implemented, for example, by technician 154, who may be a field technician interacting with a user interface provided by field recalibrator 128 executed by device 112 and/or a field recalibrator 142 executed by field device 136. References to field recalibrator 128 are interchangeable with references to field recalibrator 142.

Field device 136 may be communicatively coupled to device 112 to perform an in-field repair/replacement as a field repair device. For example, a field device communication interface 152 may be communicatively coupled to a device communication interface 148 via a wireless and/or a wired communication connection 150. A field recalibration process (e.g., an instance of field recalibrator 128) may (re)calibrate one or more components in device 112 in a field setting with field ambient condition(s) 134. For example, field recalibrator 128 may be executed to recalibrate one or more components in device 112 (e.g., first component 114, such as a light sensor) if/when device 112 is repaired (e.g., based on replacement of one or more layers in the optical stack up of display module 120).

Field recalibrator 128 may be executed, for example, if one or more components in display module 120 are repaired/replaced. Field recalibrator 128 may be executed in field ambient condition(s) 134, for example, if/when repair/replacement of a component might impact operation (e.g., generated values) of one or more components (e.g., sensors) or applications 130 that utilize information from one or more calibrated components. Field recalibrator 128 may, for example, read and/or modify calibration data 132 that an application applies for sensor measurements by first component 114. Calibration data 132 may be modified in the field, for example, to account for differences between display module 120 before replacement and display module 120 after a repair/replacement.

FIG. 2 shows an example of a system 200 in a computing environment for field recalibration, according to an example embodiment. As shown in FIG. 2, system 200 includes a reconfigurable device 202 communicating (e.g., wirelessly and/or wired) with a field device 218, for example, during a field repair operation on reconfigurable device 202. Reconfigurable device 202 is an example of reconfigurable device 112 of FIG. 1, and field device 218 is an example of field device 136 of FIG. 1. FIG. 2 corresponds to an example of FIG. 1 where field device 136 operates field recalibrator 142, although other examples may be implemented with or without a field device 136 operating field recalibrator 142. As shown in system 200, reconfigurable device 202 includes a display module, such as a touch display module (TDM) 204, a firmware interface such as a unified extensible firmware interface (UEFI) 208, and a system aggregator module (SAM) 212. Field device 218 includes a UEFI tool 220, system information tool ("sys info tool") 222, a field calibrator 224, and a solid-state device (SSD) 226. TDM 204 includes an EEPROM 206, UEFI 208 includes logic 210, and SAM 212 includes logic 214 and NVRAM 216. System 200 is described in further detail as follows.

TDM 204 may be, for example, a touch display screen, such as on a phone, laptop, notebook, tablet, and/or other computing devices. TDM 204 is an example of a field replaceable unit. TDM 204 may include an optical stack up, which may include one or more layers, such as a diffuser, lens, cover glass, aperture, decoration, holes, filters (e.g., IR ink), etc. Each of the layers of TDM 204 may be considered a field repairable component. One or more layers in the optical stack up may be associated with (e.g., may cover) one or more calibrated components, such as first, second, and/or third components 114, 116, 118, as shown in FIG. 1. For example, first component 114 may be a light sensor calibrated based on an optical stack up in TDM 204. TDM 204 may include a memory module (e.g., a non-volatile memory module), such as electrically erasable programmable read-only memory (EEPROM) 206. EEPROM 206 may store information for TDM 204. Information may include, for example, factory calibration parameters, such as offsets, adjustment factors, recalibration parameter(s), etc., which may be customized for the performance of TDM 204.

UEFI 208 may provide a software interface between an operating system (OS) and firmware. UEFI 208 may include logic 210 (e.g., firmware) that supports communication and operations, such as accessing information in (e.g., reading from and/or writing to) EEPROM 206. UEFI logic 210 may process UEFI commands received from UEFI tool 220 in field device 220. UEFI 208 logic 210 may implement security, such as time-limited access for a field repair of reconfigurable device 202. Logic 210 may detect, for example, if/when information in EEPROM 206 changes, which may trigger logic. For example, logic 210 may detect if/when all or a portion of TDM 204 is repaired/replaced, such as by detecting an altered serial number for TDM 204 stored in EEPROM 206.

SAM 212 may provide a subsystem platform to access information, such as for the power supply, batteries, sensors, etc. SAM 214 may include logic 214, for example, to communicate with field device 222, e.g., process system information (sys info) commands from sys info tool 222 in field device 222. SAM 212 may include a memory module, such as non-volatile random access memory (NVRAM) 216. For example, SAM 212 may access sensor measurements (e.g., by first component 114) and store them in NVRAM before and after repair (e.g., replacement) of a component (e.g., all or a portion of TDM 204). In some examples, SAM 212 may function as a field recalibrator of one or more components based on a field repair of one or more components. For example, SAM 212 may calculate, verify, and/or apply one or more recalibrations (e.g., multipliers, such as one or more scaling factors), which may be applied to one or more sensor measurement values based on sensor samples taken before and after a field repair. In some examples, the multipliers may be applied by one or more applications 130 that use the sensor measurements. In various examples, hardware, software, firmware and/or a combination thereof may apply one or more recalibrations (e.g., multipliers).

Field device 218 may include, for example, a UEFI tool 220, a system information (sys info) tool 222, a field recalibrator 224, and a solid state drive (SSD) 226. Field recalibrator 224 may utilize UEFI tool 220 and sys info tool 222 to communicate with UEFI 208 and SAM 212, respectively, in support of a field repair of reconfigurable device 202, which may include a field recalibration of one or more components. UEFI tool 220 may issue UEFI commands to UEFI 208, for example, to read from and/or write information to EEPROM 206, request that SAM 212 perform one or more calculations, etc. Sys info tool 222 may issue sys info requests to SAM 212, for example, to access and/or store measurements by first component (e.g., light sensor) 114 before and after technician 154 repairs one or more components in reconfigurable device 202 (e.g., TDM 204), and/or to determine one or more recalibration parameters. Field recalibrator 224 may store pre-repair samples, post-repair samples, recalibration data, etc. on a memory device, such as SSD 226.

In some examples, TDM sensor calibration data may be stored on TDM EEPROM 206 during production. TDM sensor and/or other component configuration data may be copied to SAM NVRAM 216 during field replacement operations for TDM 204. UEFI 208 may be used to copy calibration data from EEPROM 206 to NVRAM 216.

In some examples, security may be implemented by EUFI 208 and/or SAM 212 to limit access (e.g., access time) to repair/replace components in reconfigurable device 202. For example, after TDM FRU mode is detected, SAM 212 may allow sys info requests (e.g., commands) for 2 hours.

In some example, SAM 212 may perform all or a portion of the functions of field recalibrator 218. For example, SAM 212 may perform repair/replacement logic (e.g., logic 214) to verify samples, calculate recalibration multiplier(s), verify thresholds, etc. In some examples, field recalibrator 224 may sample the sensor(s) (e.g., ACS), store samples on SSD 226, and send commands (e.g., sys info requests) to SAM 212.

Figure 3:
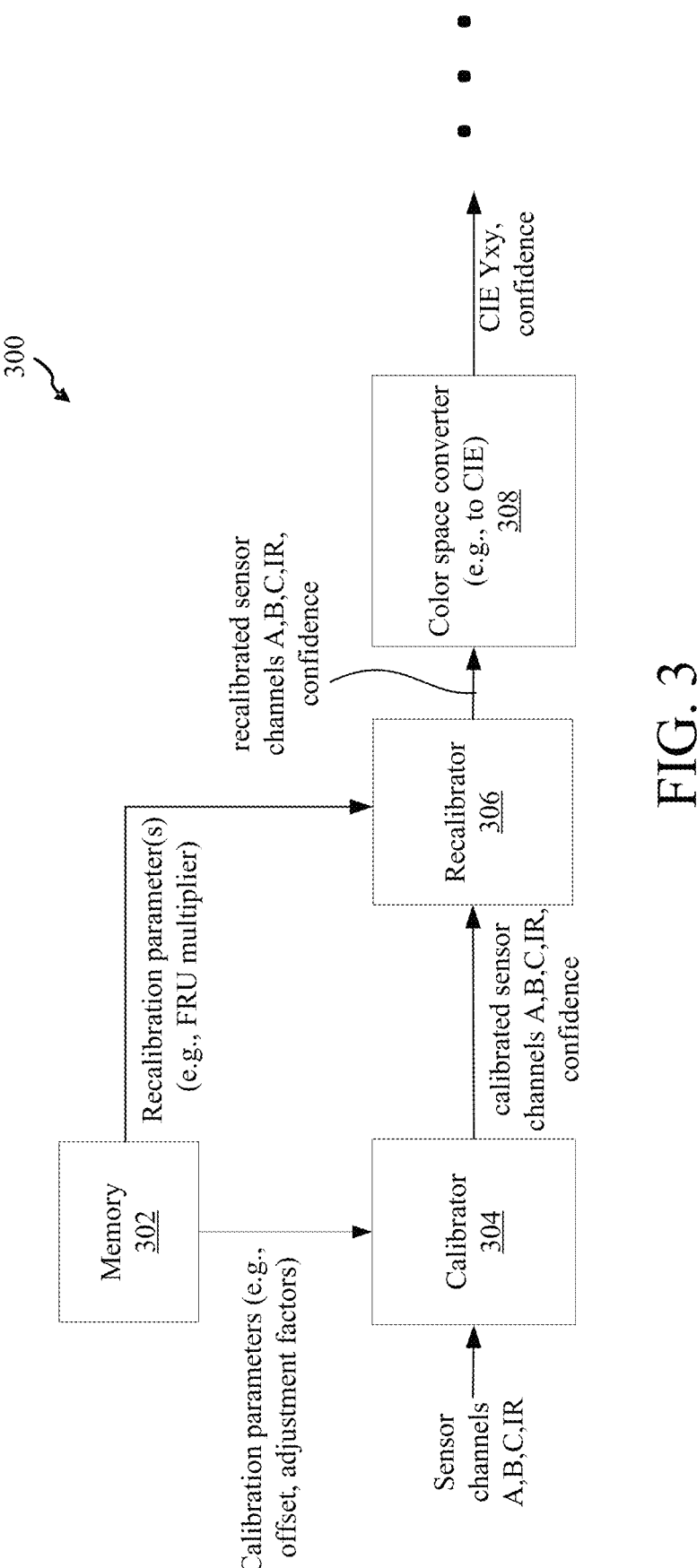
FIG. 3 shows recalibration of sensor measurement data for a display, according to an example embodiment.

FIG. 3 shows an example of using recalibration of sensor measurement data for a display, according to an example embodiment. Field recalibration system 300 is one of many example implementations. The functionality in functional blocks shown in system 300 may be implemented, in whole or in part, for example, by reconfigurable device 112/202. System 300 may include, for example, memory 302, calibrator 304, recalibrator 306, color space converter 308, and/or display adjuster 310. Various implementations may rearrange, combine, and/or eliminate functional blocks shown in system 300. For example, calibrator and recalibrator may be combined/merged in some implementations.

Memory 302 may be any type of memory. Memory 302 may be, for example, memory 126, such as EEPROM 206. Memory 302 may store factory calibration information, factory recalibration information, and/or field recalibration information.

Sensor channels A, B, C, IR may provide a series (e.g., a stream) of measurements generated, for example, by first component (e.g., light sensor) 114.

Measurement converter 304 may calibrate measurements on sensor channels A, B, C, IR, generating calibrated sensor channel values A, B, C, IR with a confidence assessment in the accuracy of the calibrated values. Measurement converter may access and apply calibration parameters, such as offset values, adjustment factors, etc., to convert measurements on sensor channels A, B, C, IR. Calibration parameters may have been determined and saved in memory 302 during factory calibration, and/or modified based on one or more recalibrations.

Recalibrator 306 may access memory 302 for one or more recalibration parameters, such as one or more field-replaceable unit (FRU) multipliers. Recalibrator 306 may multiply calibrated sensor channel data by the one or more recalibration parameters, generating recalibrated sensor channels A, B, C, IR, and confidence value(s). In some examples, recalibration may be merged with calibration. In some examples, recalibration may be implemented in an order other than as shown in system 300.

In some examples, an FRU multiplier may be determined as a product of a previous multiplier and a newly calculated multiplier in accordance with Eq. (1):

$$FruMultiplier_{new} = FruMultiplier_{calculated} \cdot FruMultiplier_{previous} \quad (1)$$

Factory calibration may set an initial multiplier (e.g., FruMultiplier$_{previous}$) by default to a value of 1.0. In some examples, a FRU multiplier may be limited within an allowed range, which may be defined by MULITPLIER_MAX (e.g., 1.8) and MULTIPLIER_MIN (e.g., 0.5).

Color space converter 308 may convert recalibrated sensor channel data to a color space, such as CIE, generating CIE Yxy, and confidence value(s). Additional functionality may be omitted. For example, a display adjuster may adjust the color space, e.g., by adjusting brightness and/or white balance.

Figure 4:
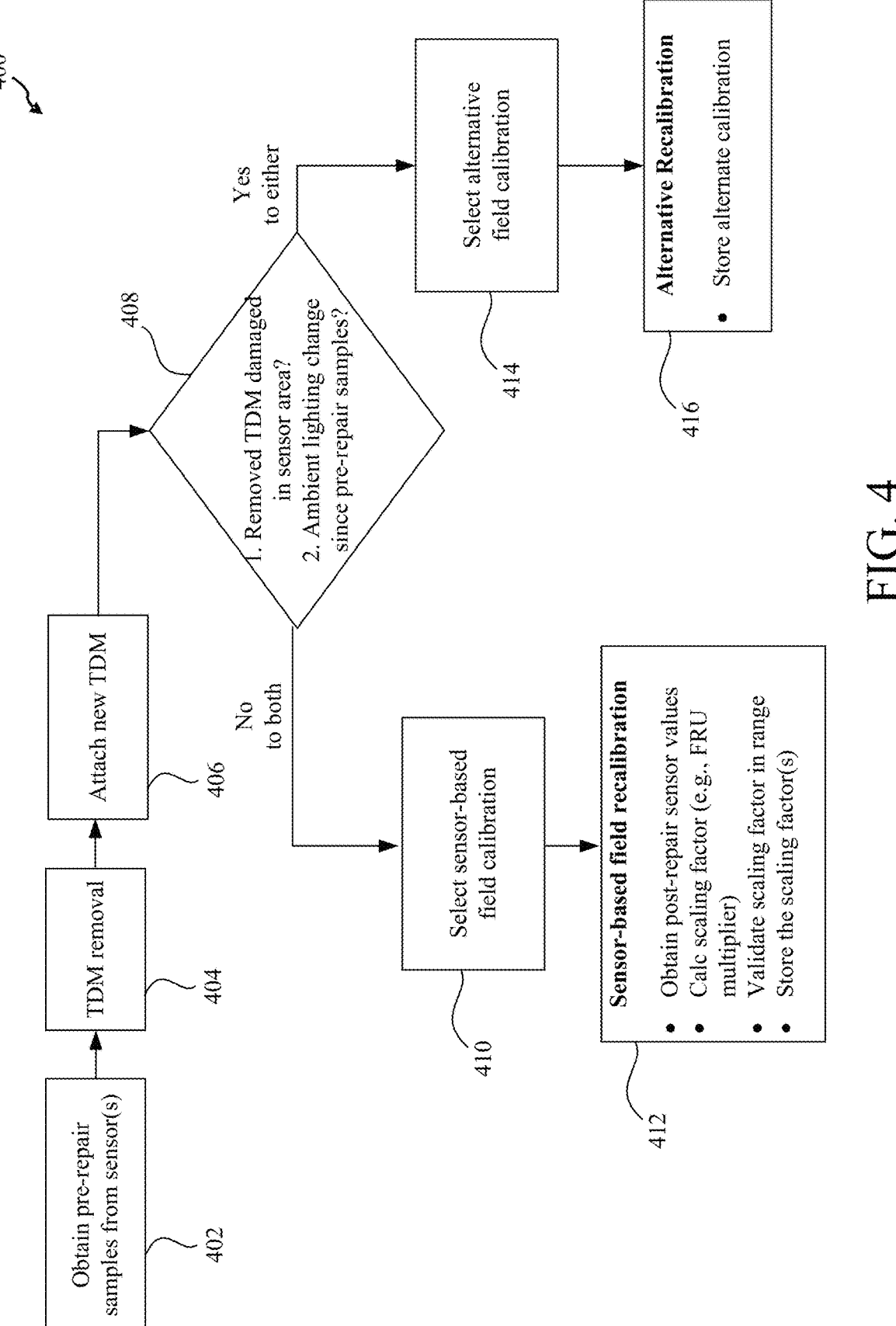
FIG. 4 shows field recalibration performed based on pre-repair and post-repair sensor measurements, according to an example embodiment.

FIG. 4 shows an example flowchart of a method 400 of field recalibration operations based on pre-repair and post-repair sensor measurements, according to an example embodiment. Embodiments disclosed herein and other embodiments may operate in accordance with example method 400. Example method 400 comprises steps 402-416, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps. FIG. 4 is described as follows with reference to FIGS. 1 and 2 to illustrate example embodiments.

In step 402, pre-repair samples may be obtained from one or more sensors. For example, with reference to FIGS. 1 and 2, field recalibrator 224 may cause sys info tool 222 to request that SAM 212 obtain pre-repair sensor measurements (samples) from first component 114 (e.g., sensor 162 as a light sensor) before one or more components in display module 120 (e.g., TDM 204) are replaced by technician 154. SAM 212 may obtain and store the samples in NVRAM 216.

In step 404, all or part of a TDM may be removed. For example, as shown in FIGS. 1 and 2, technician 154 may remove display module 120 (e.g., TDM 202).

In step 406, all or part of a TDM may be repaired/replaced (e.g., one or more layers in an optical stack up may be attached). For example, as shown in FIGS. 1 and 2, technician 154 may attach one or more layers in an optical stack up of display module 120 (e.g., TDM 202).

In step 408, a determination may be made whether the TDM was damaged in an area of the sensor(s) and/or whether ambient lighting changed since pre-repair samples were taken in step 402. For example, as shown in FIGS. 1 and 2, field recalibrator 224 may query technician 154 via a user interface to indicate whether the repaired display module 120 (e.g., TDM 202) was damaged in the area of first component 114 (e.g., sensor 162), which may impact the accuracy of measurements. An indication of no to both questions may transition example method 400 from step 408 to step 410. An indication of yes to either question may transition example method 400 from step 408 to step 414. Field recalibrator 128/142 may determine whether pre-repair field ambient condition(s) 134 are similar enough to post-repair field ambient condition(s) 134, for example, to determine whether pre-repair and post repair samples are based on comparable ambient conditions, making a comparison valid or invalid with or without compensation. For example, technician (e.g., a user) may be requested to maintain ambient conditions during sensor sampling.

In step 410, sensor-based field calibration is selected. For example, as shown in FIGS. 1 and 2, field recalibrator 224 may select field recalibration of display module 120 (e.g., TDM 202) based on measurements by first component (e.g., light sensor) 114 before and after a repair.

In step 412, sensor-based field calibration may be performed, for example, by obtaining post-repair sensor values, calculating one or more scaling factors (e.g., FRU multipliers), validating that the scaling factor(s) is (are) within a threshold range, and storing the scaling factor(s). For example, as shown in FIGS. 1-3, field recalibrator 142/224 may cause sys info tool 222 to request that SAM 212 obtain post-repair sensor measurements from first component (e.g., light sensor) 114 after one or more components in display module 120 (e.g., TDM 204) are replaced by technician 154. SAM 212 may obtain and store the samples in NVRAM 216. Field recalibrator 142/224 may cause sys info tool 222 to request that SAM 212 perform field recalibration calculations by calculating one or more scaling factors (e.g., for sensor channels A, B, C, IR), such as one or more FRU multipliers, utilizing pre-repair samples and post repair samples. Field recalibrator 142/224 may determine and/or may cause SAM 212 to determine whether the scaling factor(s) and/or the result they may generate based on calibration range(s) is (are) within a threshold range. For example, field recalibrator 142/224 may provide SAM 212 with the threshold range(s) for the determination. Field recalibrator 142/224 may cause SAM 212 to store the calculated (e.g., or otherwise determined) scaling factor(s), for example, in SAM NVRAM 216. Field recalibrator 142/224 may or may cause SAM 212 or may cause UEFI tool 220 to cause UEFI 208 to store the calculated (e.g., or otherwise determined) scaling factor(s), for example, in TDM EEPROM 206.

In step 414, alternative calibration is selected. For example, as shown in FIGS. 1 and 2, field recalibrator 224 may select a default field recalibration of display module 120 (e.g., TDM 202). A default field recalibration may be, e.g., in whole or in part, a general or non-customized field calibration, which may degrade TDM performance (e.g., compared to customized field recalibration in step 412 using measurements based on the actual part(s)/component(s)) in reconfigurable device 112/202.

In step 416, alternative calibration may be performed, for example, by storing the alternate calibration (e.g., one or more alternate calibration multipliers). For example, as shown in FIGS. 1 and 2, field recalibrator 224 may store a default field recalibration of display module 120 (e.g., TDM 202). Field recalibrator 142/224 may cause SAM 212 to store the alternate (e.g., default) scaling factor(s), for example, in SAM NVRAM 216. Field recalibrator 142/224 may cause SAM 212 or may cause UEFI tool 220 to cause UEFI 208 to store the alternate (e.g., default) recalibration, for example, in TDM EEPROM 206.

Figure 5A:
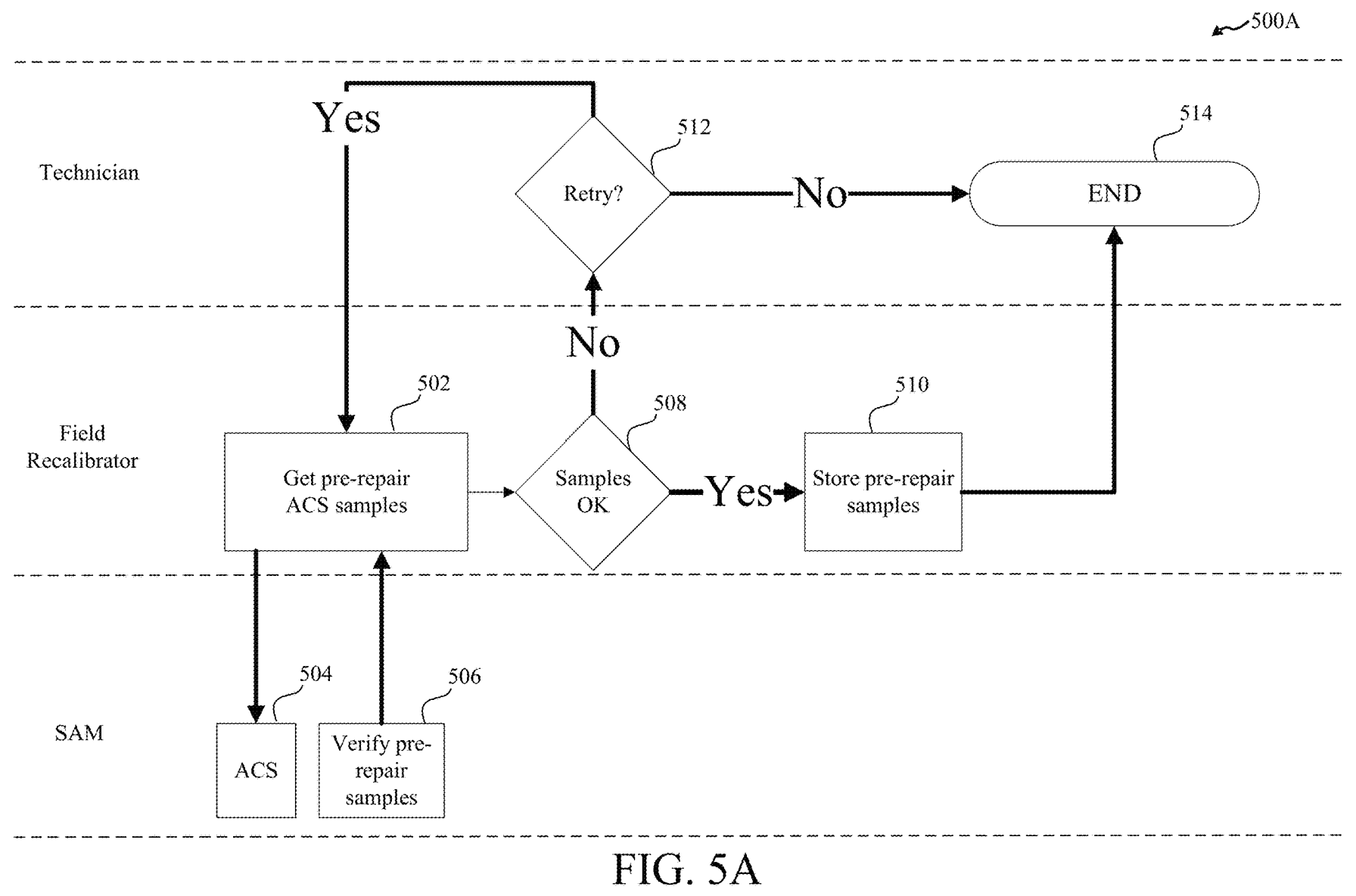
Figure 5B:
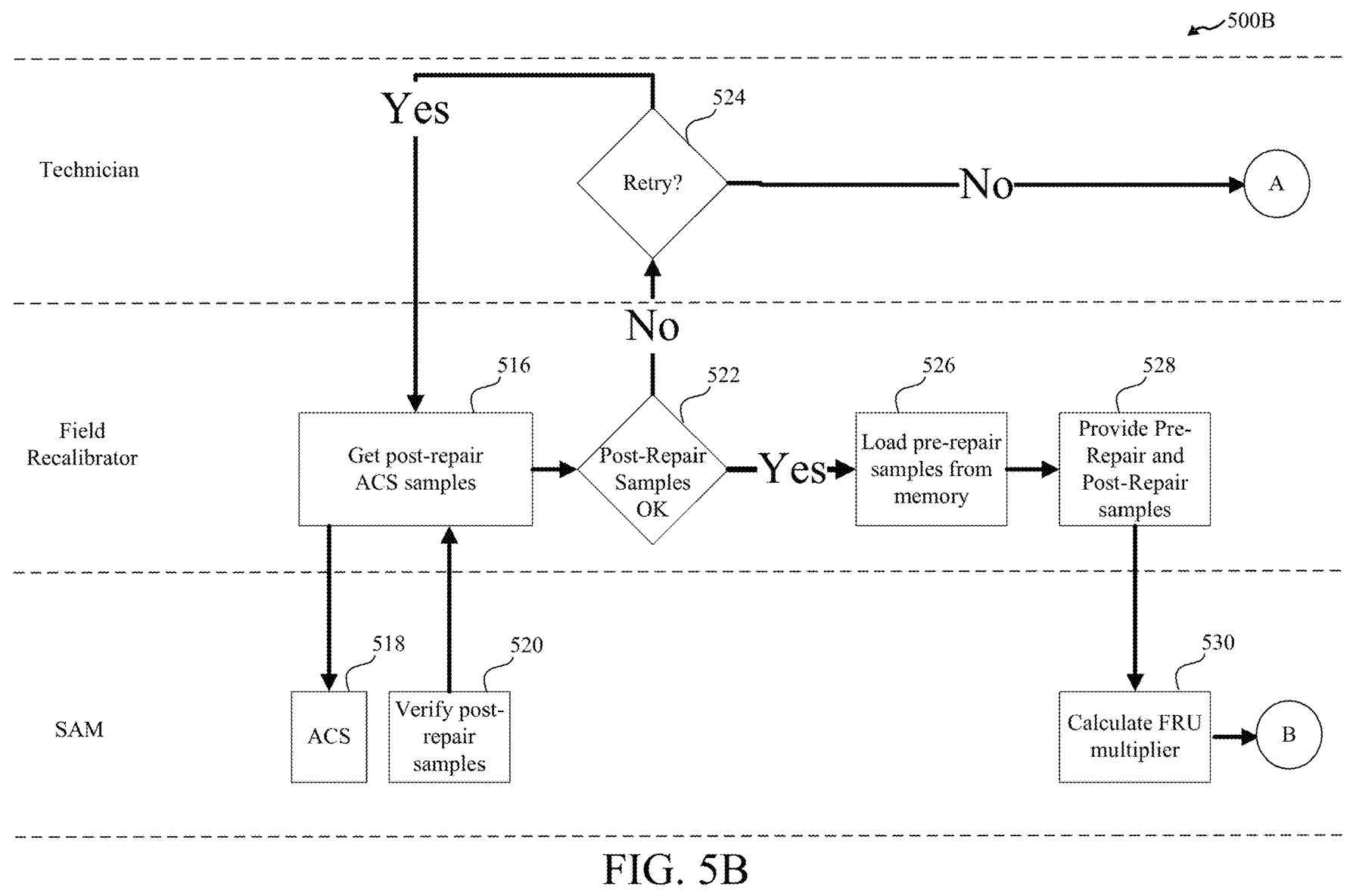

FIGS. 5A-5C show an example of an interaction diagram for field recalibration based on pre-repair and post-repair sensor measurements, according to an example embodiment. Embodiments disclosed herein and other embodiments may operate in accordance with example methods 500A-500C. Methods 500A-500C comprise steps 502-538. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIGS. 5A-5C. FIGS. 5A-5C are simply one of many possible embodiments. Embodiments may implement fewer, more or different steps. Methods 500A-500C are described as follows with reference to FIGS. 1-3 to illustrate various example embodiments.

FIGS. 5A-5C show one of many possible examples of the example operation described in other figures (e.g., FIGS. 1-4, 6 and 7). FIGS. 5A-5C show example method 500A-500C, respectively, using field device 136 operating field recalibrator 142 and reconfigurable device 112, although other examples may be implemented with or without a field device 136 operating field recalibrator 142. For example, reconfigurable device may operate field recalibrator 128 (e.g., using display module 120 or a display module on field device 136 (not shown).

FIG. 5A shows method 500A of an example of a pre-repair procedure to obtain and verify sensor samples, e.g., for use in a recalibration procedure. As shown in the example interaction diagram of FIG. 5A, in step 502, the field recalibrator may get pre-repair adaptive color sensor (ACS) samples. For example, as shown in FIGS. 1 and 2, field recalibrator 224 may cause sys info tool 222 to request that SAM 212 obtain pre-repair sensor measurements (samples) from first component 114 (e.g., light sensor/ACS) before one or more components in display module 120 (e.g., TDM 204) are replaced by technician 154.

In step 504, SAM 212 may access the sensor (e.g., ACS). For example, as shown in FIGS. 1 and 2, SAM 212 may access first component (e.g., light sensor/ACS) 114 to obtain sensor measurements (e.g., for each of sensor channels A, B, C, IR) prior to repair of display module 120 (e.g., TDM 204). SAM 212 may store the pre-repair samples, for example, in NVRAM 216.

In step 506, the pre-repair samples may be evaluated/verified. For example, as shown in FIGS. 1 and 2, field recalibrator 142/224 may determine and/or (e.g., as shown by example in FIG. 5A) may cause SAM 212 to determine whether the pre-repair samples (e.g., for sensor channels A, B, C, IR) are within a threshold range. For example, field recalibrator 142/224 may provide SAM 212 with the threshold range(s) for the determination(s) about the pre-repair samples.

In step 508, a determination may be made about the validity of the pre-repair samples. For example, as shown in FIGS. 1 and 2, field recalibrator 142/224 may proceed to step 506 if the samples are within a valid range. Field recalibrator 142/224 may proceed to step 508 if the samples are not within a valid range. By determining that the samples are within a valid range, it may be established that there has not been a component/sensor malfunction.

In step 510, valid (e.g., in-range) pre-repair samples may be stored. For example, as shown in FIGS. 1 and 2, field recalibrator 142/224 may cause SAM 212 to store the samples in NVRAM 216 and/or field recalibrator 142/224 may store the samples in SSD 226. The example method may proceed from step 510 to the end of the pre-repair procedure at step 514.

In step 512, e.g., if the samples are invalid/out-of-range, a technician may be provided with an opportunity to retry pre-repair sample collection. For example, as shown in FIGS. 1 and 2, field recalibrator 142/224 may ask technician 154 whether technician 154 wants to retry pre-repair sample collection. A "no" response may cause the example method to end a pre-repair portion of the method at step 514. A "yes" response may cause example method to return to step 502.

FIG. 5B shows method 500B of an example of a post-repair procedure to obtain and verify sensor samples and determine one or more recalibration parameters, e.g., for use in a recalibration procedure. FIG. 5C shows method 500C, which is a continuation of method 500B of FIG. 5B. FIGS. 5B and 5C are described in further detail as follows.

As shown in method 500B of the example interaction diagram of FIG. 5B, in step 516, the field recalibrator may get post-repair ACS samples. For example, as shown in FIGS. 1 and 2, field recalibrator 224 may cause sys info tool 222 to request that SAM 212 obtain post-repair sensor measurements (samples) from first component 114 (e.g., light sensor/ACS) after technician 154 replaces one or more components in display module 120 (e.g., TDM 204).

In step 518, SAM 212 may access the sensor (e.g., ACS). For example, as shown in FIGS. 1 and 2, SAM 212 may access first component (e.g., light sensor/ACS) 114 to obtain sensor measurements (e.g., for each of sensor channels A, B, C, IR) after the repair of display module 120 (e.g., TDM 204). SAM 212 may store the post-repair samples, for example, in NVRAM 216.

In step 520, the post-repair samples may be evaluated/ verified. For example, as shown in FIGS. 1 and 2, field recalibrator 142/224 may determine and/or (e.g., as shown by example in FIG. 5A) may cause SAM 212 to determine whether the post-repair samples (e.g., for sensor channels A, B, C, IR) are within a threshold range. For example, field recalibrator 142/224 may provide SAM 212 with the threshold range(s) for the determination(s) about the validity of the post-repair samples.

In step 522, a determination may be made about the validity of the post-repair samples. For example, as shown in FIGS. 1 and 2, Field recalibrator 142/224 may proceed to step 524 if the samples are not within a valid range (e.g., indicating component/sensor malfunction). Field recalibrator 142/224 may proceed to step 526 if the samples are within a valid range. Again, by determining that the samples are within a valid range, it may be established that there has not been a component/sensor malfunction.

In step 524, e.g., if the post-repair samples are invalid/ out-of-range, a technician may be provided with an opportunity to retry post-repair sample collection. For example, as shown in FIGS. 1 and 2, field recalibrator 142/224 may ask technician 154 whether technician 154 wants to retry post-repair sample collection. A "no" response may cause example the example method to proceed to alternative calibration at step 536 of method 500C shown in FIG. 5C. A "yes" response may cause the example method to return to step 516.

In step 526, valid (e.g., in-range) pre-repair samples may be loaded from memory. For example, as shown in FIGS. 1 and 2, field recalibrator 142/224 may cause SAM 212 to load the pre-repair samples in NVRAM 216 and/or field recalibrator 142/224 may load the pre-repair samples from SSD 226. The example method may proceed from step 526 to step 528.

In step 528, pre-repair samples and post-repair samples are provided by field recalibrator to the SAM. For example, as shown in FIGS. 1 and 2, field recalibrator 142/224 may provide pre-repair samples and post-repair samples to SAM 212.

In step 530, recalibration may be performed, for example, by calculating one or more FRU multipliers. For example, as shown in FIGS. 1-3, SAM 212 may determine one or more multipliers to apply to sensor channels A, B, C, IR to attempt to provide consistent performance of first component (e.g., light sensor/ACS) 114 before damage/malfunction (e.g., based on factory calibration) and post-repair with one or more components of display module 120 (e.g., TDM 204) repaired (e.g., replaced). The operation/performance (e.g., optical characteristics) of one or more components (e.g., the measurements/samples provided by first component 114) may vary between pre-repair and post-repair of display module 120 (e.g., TDM 204). SAM 212 may use pre-repair samples and post-repair samples to adjust factory calibration (e.g., and/or previous factory/field recalibration) with one or more field recalibrations, which may be referred to as an FRU multiplier. Field recalibration of samples may (e.g., effectively) be used by reconfigurable device 112 to recalibrate operation of one or more components, e.g., display module 120 (TDM 204), that may be dependent on sensor samples. FIG. 3 shows an example of adjusting device calibration (e.g., calibrator 304) with recalibration (e.g., recalibrator 306) by applying one or more field recalibration parameters determined by field recalibrator 128/142/224.

As shown in method 500C of FIG. 5C, in step 532, the determined recalibration parameters (e.g., FRU multiplier(s)) and the performance consistency of reconfigurable device 102 and/or a portion thereof (e.g., display module 120, such as TDM 204)) relative to factory configured (e.g., and/or previously reconfigured) performance may be evaluated/verified, e.g., by the SAM. For example, as shown in FIGS. 1 and 2, field recalibrator 142/224 may determine and/or (e.g., as shown by example in FIG. 5C) may cause SAM 212 to determine whether the determined recalibration parameters (e.g., FRU multiplier(s), such as for sensor channels A, B, C, IR) and the performance consistency of reconfigurable device 102 and/or a portion thereof (e.g., display module 120, such as TDM 204)) are within a threshold range. For example, field recalibrator 142/224 may provide SAM 212 with the threshold range(s) for the determination(s) about the recalibration parameters (e.g., FRU multiplier(s)) and the performance consistency of reconfigurable device 102 and/or a portion thereof (e.g., display module 120, such as TDM 204)). The example method may proceed to step 536 if the recalibration parameters (e.g., FRU multiplier(s)) and the performance consistency of reconfigurable device 102 or a portion thereof (e.g., display module 120, such as TDM 204)) are within a valid range. The example method may proceed to step 508 if the recalibration parameters (e.g., FRU multiplier(s)) and the performance consistency of reconfigurable device 102 or a portion thereof (e.g., display module 120, such as TDM 204)) are not within a valid range.

In step 534, valid recalibration parameters (e.g., FRU multiplier(s)) may be stored in memory. For example, as shown in FIGS. 1 and 2, field recalibrator 142/224 may store the valid recalibration parameters (e.g., FRU multiplier(s)) in NVRAM 216 and/or field recalibrator 142/224 may cause SAM 212 to store the valid recalibration parameters (e.g., FRU multiplier(s)) in NVRAM 216 and/or URFI 208 to store the recalibration parameters (e.g., FRU multiplier(s)) in EEPROM 206. Step 534, e.g., upon completion, may proceed to the end of the example method at step 538.

In step 536, alternative calibration may be performed if the recalibration parameters (e.g., FRU multiplier(s)) and/or the performance consistency of reconfigurable device 102 or a portion thereof (e.g., display module 120, such as TDM 204)) are beyond a valid range. For example, as shown in FIGS. 1 and 2, field recalibrator 224 may select a default field recalibration of display module 120 (e.g., TDM 202). A default field recalibration may be, e.g., in whole or in part, a general or non-customized field calibration, which may degrade TDM performance (e.g., compared to customized field recalibration in step 412 using measurements based on the actual part(s)/component(s)) in reconfigurable device 112/202. Step 536, e.g., upon completion, may proceed to the end of the example method at step 538.

FIG. 6 shows an example flowchart providing a method 600 of the operation of field repair recalibration, according to an example embodiment. Embodiments disclosed herein and other embodiments may operate in accordance with example method 600. Method 600 comprises steps 602-606, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps. Method 600 of FIG. 6 is described as follows with reference to FIGS. 1-3 to illustrate example embodiments.

Method 600 may (e.g., optionally) comprise step 602. In step 602, an in-field recalibration may be generated for a field repairable device. The field repairable device may comprise a field repairable component and a sensor configured to generate samples dependent on the field repairable component. By the sensor generating samples dependent on the field repairable component, the samples may be used to determine changes due to changing out the field repairable component. The in-field recalibration may be generated based on: a pre-repair sample generated by the sensor before repair of the field repairable component; and a post-repair sample generated by the sensor after repair of the field repairable component in the field repairable device. For example, as shown in FIGS. 1 and 2, reconfigurable device 112 comprises display module 120, first component (e.g., light sensor), second component 116, and third component 118. First component 114 may generate samples that depend on display module 120. Field recalibrator 128 and/or field recalibrator 142 may generate an in-field recalibration for (e.g., future) samples generated by first component 114 based on (e.g., light and/or color) measurements generated by first component (e.g., light sensor) 114 before and after repair/replacement of display module 120 (e.g., TDM 204).

In step 604, the in-field recalibration may be applied to samples generated by the sensor. For example, as shown in FIG. 3, recalibrator 306 may apply the recalibration determined in step 602 to samples for one or more channels (e.g., A, B, C, IR) generated by first component 114. The recalibration value(s) may be applied, for example, in accordance with Eq. (1).

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. Computing device 702 is an example of factory device 104, reconfigurable device 112, and field device 136 of FIG. 1, each of which may include one or more of the components of computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of factory calibrator 110, field recalibrator 128, application(s) 130, field recalibrator 142, UEFI 208, logic 210, SAM 212, logic 214, field recalibrator 224, system 300, calibrator 304, recalibrator 306, color space converter 308, along with any components and/or subcomponents thereof, as well as the flowcharts/flow diagrams (e.g., methods 400, 500A, 500B, 500C, and/or 600) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Example Embodiments

Methods, systems, and computer program products are provided for field repair recalibration. A field repairable device with a field repairable component (e.g., field replaceable unit (FRU)) may be recalibrated in the field. Field recalibration may be component-specific without sophisticated factory calibration equipment. For example, a light sensor (e.g., brightness and/or color measurements) dependent on one or more optical layers in a display module (e.g., a touch display module) may be recalibrated in the field based on the properties of the post-repair FRU that replaced a damaged/inoperable pre-repair FRU (e.g., TDM or a portion thereof). A sensor may be integrated in or separate from an FRU. A field recalibrator (e.g., in a field repairable device and/or in a field repair device) may be configured to generate an in-field recalibration of a sensor based on a pre-repair sample generated by the sensor before repair of a field repairable component; and a post-repair sample generated by the sensor after repair of the field repairable component.

In examples, a device (e.g., alone and/or with a field repair device) may perform self-calibration of display light and/or color output. One or more layers in a display may be repaired/replaced in a computing device. The computing device may perform a recalibration of a repaired (e.g., newly installed) display. Existing or new sensors may be used for the recalibration of the repaired display. The sensor(s) may generate display light intensity and/or color output measurements prior to repair/replacement. The sensor(s) may be used to measure the display light intensity and/or color provided by the repaired (e.g., new) display, for example, based on the same or similar signals provided to the pre-repaired display and the repaired display for light and/or color (re)calibration and/or based on the same or similar ambient condition(s) for pre- and post-repair samples. The measured difference(s) in the sampled display light and/or color output may be used to make adjustments to the signals used to drive display light and/or color output, e.g., to more closely match the original display light and/or color output provided using the signals during calibration. The adjustments may be used to control the signals provided to the repaired display to provide display output.

In examples, one or more devices may implement a method for in-field correction/re-calibration of a light sensor after TDM in-field repair/replacement. Light strength may be measured (e.g., in lux) by a light sensor while using the pre-repair TDM (e.g., before replacement). Light strength may be measured (e.g., in lux) by the light sensor while using the post-repair (e.g., new) TDM (e.g., after replacement). A recalibration parameter (e.g., a factor, ratio) may be determined based on (e.g., between) the old TDM light strength measurement and the new TDM light strength measurement. The recalibration factor may be stored (e.g., as a re-calibration parameter) in firmware. Light sensor samples may be multiplied by the recalibration factor, for example, to generate more accurate sensor measurement calibrations (e.g., according to an uncalibrated repair/replacement component, such as cover glass). An application (e.g., a script) may instruct a user to complete a step-by-step process and to monitor progress. Alternate recalibration may be implemented, for example, if the re-calibration method fails, if the TDM is broken in sensor area, and/or if ambient lighting changes after light and/or color measurements while using the old TDM (e.g., before replacement). For example, a TDM and/or sensor may be recalibrated individually, which may allow in-field replacement while generating a new end-to-end (re)calibration value. For example, a default recalibration value (e.g., nominal factory value) may be implemented after repair/replacement (e.g., based on one or more failures in pre-repair and post-repair sensor-measurement-based recalibration).

In examples, a device may comprise a field recalibrator configured to generate an in-field recalibration of a sensor based at least in part on: a pre-repair sample generated by the sensor before repair of a field repairable component; and a post-repair sample generated by the sensor after repair of the field repairable component.

A device may provide the in-field recalibration to a field repairable device comprising the field repairable component and the sensor.

A device may (e.g., further) comprise the field repairable component and the sensor, which may generate samples dependent on the field repairable component. The device may apply the in-field recalibration.

The sensor may be integrated with the field repairable component. The sensor may, alternatively, be separate from the field repairable component.

The field repairable component may comprise a field replaceable unit (FRU).

The FRU may comprise at least one layer in an optical stack up of a touch display module (TDM).

In some examples, the sensor may comprise a light and color sensor. The pre-repair sample may comprise an in-field pre-repair measurement of light and color of an ambient environment. The post-repair sample may comprise an in-field post-repair measurement of light and color of the ambient environment.

The in-field recalibration may comprise a multiplier applied to a plurality of sensor sample channels generated by the sensor (e.g., A, B, C and infrared (IR) channels. The in-field recalibration may be applied before color space conversion of the samples in the channel(s).

The field recalibrator may be (e.g., further) configured to perform at least one of the following: determine whether the pre-repair sample is within a valid pre-repair range (to confirm the pre-repair sample is consistent with proper device operation and thus is usable); determine whether the post-repair sample is within a valid post-repair range (to confirm the post-repair sample is consistent with proper device operation and thus is usable); determine whether the in-field recalibration (e.g., scaling factor) is within a valid recalibration range; or determine whether the post-repair performance (e.g., operation) of at least a portion of the device is within a valid performance range (e.g., relative to/consistent with pre-repair performance, to confirm device replacement was successful without degraded device performance).

In examples, a method may comprise generating an in-field recalibration for a field repairable device comprising a field repairable component and a sensor configured to generate samples dependent on the field repairable component based at least in part on: a pre-repair sample generated by the sensor before repair of the field repairable component; and a post-repair sample generated by the sensor after repair of the field repairable component in the field repairable device.

A method may (e.g., further) comprise providing the in-field recalibration to the field repairable device.

In some examples, the device may comprise the field repairable device. The method may (e.g., further) comprise applying the in-field recalibration to samples generated by the sensor.

The sensor may be integrated with the field repairable component or the sensor may be separate from the field repairable component.

The field repairable component may comprise at least one layer in an optical stack up of a touch display module (TDM).

The sensor may comprise a light and color sensor. The pre-repair sample may comprise an in-field pre-repair measurement of light and color of an ambient environment. The post-repair sample may comprise an in-field post-repair measurement of light and color of the ambient environment.

The in-field recalibration may comprise a multiplier applied to a plurality of sensor sample channels generated by the sensor (e.g., A, B, C and infrared (IR) channels). The recalibration may be applied before color space conversion of the samples in the channel(s).

A method may (e.g., further) comprise at least one of the following: determining whether the pre-repair sample is within a valid pre-repair range; determining whether the post-repair sample is within a valid post-repair range; determining whether the in-field recalibration (e.g., scaling factor) is within a valid recalibration range; or determining whether the post-repair performance (e.g., operation) of at least a portion of the method is within a valid performance range (e.g., relative to/consistent with pre-repair performance).

In examples, a computer-readable storage medium may have program instructions recorded thereon that, when executed by a processing circuit, perform a method, which may comprise generating an in-field recalibration for a field repairable device comprising a field repairable component and a sensor configured to generate samples dependent on the field repairable component based at least in part on: a pre-repair sample generated by the sensor before repair of the field repairable component; and a post-repair sample generated by the sensor after repair of the field repairable component in the field repairable device.

A method may (e.g., further) comprise applying the in-field recalibration to samples generated by the sensor.

The field repairable component may comprise at least one layer in an optical stack up of a touch display module (TDM). The sensor may comprise a light and color sensor. The pre-repair sample may comprise an in-field pre-repair measurement of light and color of an ambient environment. The post-repair sample may comprise an in-field post-repair measurement of light and color of the ambient environment.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least in part on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A method in a device for calibrating a sensor associated with a display, the method comprising:
   obtaining pre-repair samples generated by the sensor;
   after repair or replacement of the display, determining whether ambient lighting changed since obtaining the pre-repair samples; and
   at least in response to a determination that ambient light did not change since obtaining the pre-repair samples, performing sensor-based field calibration of the sensor.

2. The method of claim 1, wherein said performing sensor-based field calibration of the sensor comprises:
   after the repair or replacement of the display, determining whether the display was damaged in an area of the sensor; and
   in response to the determination that ambient light did not change since obtaining the pre-repair samples, and to a determination that the display was not damaged in an area of the sensor, performing the sensor-based field calibration of the sensor.

3. The method of claim 1, wherein said performing comprises:
   obtaining post-repair samples generated by the sensor;
   calculating one or more scaling factors based on the pre-repair samples and the post-repair samples;
   validating that the one or more scaling factors are within a threshold range; and
   storing the one or more scaling factors.

4. The method of claim 3, further comprising:
   applying the one or more scaling factors to one or more sensor measurement values.

5. The method of claim 3, wherein the sensor comprises a light and color sensor;
   wherein a pre-repair sample comprises an in-field pre-repair measurement by the light and color sensor of light and color of an ambient environment; and
   wherein a post-repair sample comprises an in-field post-repair measurement by the light and color sensor of light and color of the ambient environment.

6. The method of claim 3, further comprising at least one of:
   determining whether a pre-repair sample is within a valid pre-repair range; or
   determining whether a post-repair sample is within a valid post-repair range.

7. The method of claim 1, wherein the sensor and the display are integrated in the device.

8. The method of claim 1, wherein the sensor and the display are separate from the device.

9. A method in a device for calibrating a sensor associated with a display, the method comprising:
   obtaining pre-repair samples generated by the sensor;
   after repair or replacement of the display, determining whether the display was damaged in an area of the sensor; and
   in response to the determination that the display was not damaged in an area of the sensor, performing the sensor-based field calibration of the sensor.

10. The method of claim 9, wherein said performing comprises:
   obtaining post-repair samples generated by the sensor;
   calculating one or more scaling factors based on the pre-repair samples and the post-repair samples;
   validating that the one or more scaling factors are within a threshold range; and
   storing the one or more scaling factors.

11. The method of claim 10, further comprising:
   applying the one or more scaling factors to one or more sensor measurement values.

12. The method of claim 10, wherein the sensor comprises a light and color sensor;
   wherein a pre-repair sample comprises an in-field pre-repair measurement by the light and color sensor of light and color of an ambient environment; and
   wherein a post-repair sample comprises an in-field post-repair measurement by the light and color sensor of light and color of the ambient environment.

13. The method of claim 10, further comprising at least one of:
   determining whether a pre-repair sample is within a valid pre-repair range; or
   determining whether a post-repair sample is within a valid post-repair range.

14. The method of claim 9, wherein the sensor and the display are integrated in the device.

15. The method of claim 9, wherein the sensor and the display are separate from the device.

16. A device, comprising:
   a processor;
   a memory device that stores program code structured to cause the processor to:
      obtain pre-repair samples generated by a sensor;
      after repair or replacement of the display, determine whether ambient lighting changed since obtaining the pre-repair samples; and
      at least in response to a determination that ambient light did not change since obtaining the pre-repair samples, perform sensor-based field calibration of the sensor.

17. The device of claim 16, wherein to perform the sensor-based field calibration of the sensor, the program code is further structured to cause the processor to:
   after the repair or replacement of the display, determine whether the display was damaged in an area of the sensor; and
   in response to the determination that ambient light did not change since obtaining the pre-repair samples, and to the determination that the display was not damaged in an area of the sensor, perform the sensor-based field calibration of the sensor.

18. The device of claim 16, wherein to perform the sensor-based field calibration of the sensor, the program code is further structured to cause the processor to:
   obtain post-repair samples generated by the sensor;
   calculate one or more scaling factors based on the pre-repair samples and the post-repair samples;

validate that the one or more scaling factors are within a threshold range; and store the one or more scaling factors.

19. The device of claim 16, wherein the device comprises the sensor and the display.

20. The device of claim 16, wherein the sensor and the display are separate from the device.

\* \* \* \* \*